(12) United States Patent
Yonekura et al.

(10) Patent No.: US 7,796,851 B2
(45) Date of Patent: Sep. 14, 2010

(54) MANUFACTURING METHOD OF OPTICAL WAVEGUIDE, OPTICAL WAVEGUIDE AND OPTICAL RECEPTION/TRANSMISSION APPARATUS

(75) Inventors: Hideki Yonekura, Nagano (JP); Takanori Yamamoto, Nagano (JP); Kazunao Yamamoto, Nagano (JP); Kenji Yanagisawa, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 0 days.

(21) Appl. No.: 12/410,576

(22) Filed: Mar. 25, 2009

(65) Prior Publication Data

US 2009/0245725 A1    Oct. 1, 2009

(30) Foreign Application Priority Data

Apr. 1, 2008    (JP) .............................. 2008-095297

(51) Int. Cl.
G02B 6/26    (2006.01)
(52) U.S. Cl. ........................................ 385/47; 385/129
(58) Field of Classification Search .................. 385/47, 385/129
See application file for complete search history.

(56) References Cited

U.S. PATENT DOCUMENTS

| 6,850,674 | B2 * | 2/2005 | Haraguchi et al. ......... 385/129 |
| 7,316,512 | B2 * | 1/2008 | Shih et al. ...................... 385/93 |
| 7,406,229 | B2 * | 7/2008 | Bae et al. ....................... 385/47 |
| 7,421,157 | B2 * | 9/2008 | Ide et al. ........................ 385/24 |
| 2002/0048431 | A1 | 4/2002 | Kimura |
| 2006/0110114 | A1 * | 5/2006 | Yanagisawa et al. ........ 385/129 |
| 2006/0245681 | A1 * | 11/2006 | Uchida ......................... 385/14 |

FOREIGN PATENT DOCUMENTS

| JP | 6-265738 A | 9/1994 |
| JP | 2001-272565 A | 10/2001 |
| JP | 2002-131586 A | 5/2002 |
| JP | 2007-183467 A | 7/2007 |
| JP | 2007-183468 A | 7/2007 |

* cited by examiner

*Primary Examiner*—Charlie Peng
(74) *Attorney, Agent, or Firm*—IPUSA, PLLC

(57) ABSTRACT

A manufacturing method of an optical waveguide, the optical waveguide including a first clad layer; a core layer formed on the first clad layer and configured to propagate light; a second clad layer formed on the first clad layer so as to cover the core layer; and a light propagation direction changing part configured to change a propagation direction of the light propagating in the core layer; the manufacturing method of the optical waveguide includes the steps of forming a concave part penetrating the first clad layer and the core layer; and inserting the light propagation direction changing part into the concave part so that a light propagation direction changing surface of the light propagation direction changing part forms a predetermined inclination angle to a predetermined reference plane.

12 Claims, 12 Drawing Sheets

MANUFACTURING METHOD OF OPTICAL WAVEGUIDE, OPTICAL WAVEGUIDE AND OPTICAL RECEPTION/TRANSMISSION APPARATUS

BACKGROUND OF THE INVENTION

1. Field of the Invention

The present invention generally relates to a manufacturing method of an optical waveguide, the optical waveguide, and an optical reception/transmission apparatus.

2. Description of the Related Art

Recently, operation speed (operation clock) of a central processing unit (CPU) or the like has been increased with increase in density of internal electrodes of an integrated circuit. On the other hand, signal transmission speed based on an electrical transmission method has almost reached a maximum limit, which becomes a bottleneck of the processing speed of a CPU or the like. Further, problems such as crosstalk and electromagnetic interference (EMI) noise of a high density electrode have risen with the increase in the operation speed of a CPU or the like. A solution is required to reduce the noise.

An optical interconnection method (optical wiring method) using optical waveguides has been receiving attention as a method for solving the problems. The optical interconnection method is capable of performing a broadband transmission far better compared to the electrical transmission method. The optical interconnection method can be adapted to increase the processing speed and provide a signal transmission system using optical parts with a compact size and lower power consumption. Further, the crosstalk noise and EMI noise can be reduced.

FIG. 1 is a cross section showing an example of an optical reception/transmission apparatus 200 including an optical waveguide 100 of related art. Referring to FIG. 1, the optical reception/transmission apparatus 200 is formed by the optical waveguide 100, a light emitting element 201 including a light emitting part 201a, and a light receiving element 202 including a light receiving part 202a. The optical waveguide 100 includes a supporting substrate 101, a core layer 102, a clad layer 103, grooves 104 and 105, and metal layers 106 and 107. $\theta_1$ is 45 degrees.

In the optical waveguide 100, the core layer 102 and the clad layer 103 are formed on the supporting substrate 101. The clad layer 103 is formed by a first clad layer 103a and a second clad layer 103b. The core layer 102 and the clad layer 103 include the grooves 104 and 105 which are formed to penetrate the core layer 102 and the clad layer 103. The metal layer 106 is formed on a 45 degree inclined part of the groove 104 and the metal layer 107 is formed on a 45 degree inclined part of the groove 105.

The light emitting element 201 including the light emitting part 201a is formed above the groove 104 of the optical waveguide 100. The light receiving element 202 including the light receiving part 202a is formed above the groove 105 of the optical waveguide 100.

In the optical reception/transmission apparatus 200, light emitted from the light emitting part 201a of the light emitting element 201 enters the optical waveguide 100 and a propagation direction of the light is changed by 90 degrees with the metal layer 106 as indicated by arrows in FIG. 1, and then the light enters the core layer 102. A refractive index of the core layer 102 is designed to be higher than that of the clad layer 103, so that the light entering the core layer 102 propagates within the core layer 102 without transmitting through the clad layer 103.

The light propagating within the core layer 102 reaches the metal layer 107. The propagation direction of the light is changed by 90 degrees with the metal layer 107 and enters the light receiving part 202a of the light receiving element 202. In this way, the metal layer 106 and the metal layer 107 formed on the 45 degree inclined parts of the groove 104 and the groove 105 function as direction changing parts of light propagation direction.

The optical waveguide 100 of FIG. 1 is manufactured by which the core layer 102 and the clad layer 103 are formed on the supporting substrate 101, and the groove 104 and the groove 105 having 45 degree inclined parts penetrating the core layer 102 and the clad layer 103 are formed. Further, the metal layers 106 and 107 are formed on the 45 degree inclined parts of the core layer 102 and the clad layer 103.

The grooves 104 and 105 having the 45 degree inclined parts may be formed by a dicing process, a die imprinting or the like. Also, as another forming method of the grooves 104 and 105, it has been proposed that a dry etching method is conducted to perform patterning with a photoresist mask having mask patterns in which sizes of openings or density of the openings are gradually increased or reduced in a longitudinal direction of the optical waveguide 100. Further, as another forming method of the grooves 104 and 105, it has been proposed that a photo mask for forming the core layer 102 is separated from a surface of the material of the core layer 102 more than approximately 500 μm and exposed by light so that light diffraction for curing material is controlled.

With respect to another optical waveguide, it has been proposed to use mirror members having mirror surfaces instead of the grooves 104 and 105 and the metal layers 106 and 107 of the 45 degree inclined parts of the optical waveguide 100. These optical waveguides can be manufactured by curing liquid state material forming the optical waveguide in which the mirror members having mirror surfaces are imbedded in the manufacturing process of the optical waveguide.

Patent document 1: Japanese Patent Application Publication No. H6-265738

Patent document 2: Japanese Patent Application Publication No. 2001-272565

Patent document 3: Japanese Patent Application Publication No. 2002-131586

Patent document 4: Japanese Patent Application Publication No. 2007-183467

Patent document 5: Japanese Patent Application Publication 2007-183468

In a manufacturing method of the optical waveguide 100 of a related art, after forming the 45 degree inclined parts of the groove 104 and the groove 105, a forming process of the metal layers 106 and 107 is necessary after forming the grooves 104 and 105 having the 45 degree inclined parts by a sputtering method, a nonelectrolytic plating method or the like. This method has been a problem because the manufacturing process is complicated.

The problem is that a mask for forming partial parts of the metal layers 106 and 107 is necessary in a process of forming the metal layers 106 and 107 on the 45 degree inclined parts, because it is difficult to perform alignment between the mask and the microstructured 45 degree inclined parts of the grooves 104 and 105.

Further, when the mirror members having mirror surfaces are used instead of the grooves 104 and 105 and the metal layers 106 and 107 of the 45 degree inclined parts of the optical waveguide 100, the material used for the optical waveguide is limited to liquid state material. In this case, film shape material cannot be used. Thus, there has been a problem that a film material cannot be used.

SUMMARY OF THE INVENTION

It is a general object of the present invention to provide a manufacturing method of an optical waveguide, the optical waveguide, and an optical reception/transmission apparatus in which the optical waveguide can be formed independent of the material of the optical waveguide, the direction changing parts of light propagation can be formed based on a simple process, and the problem above is minimized.

More specifically, the embodiments of the present invention may provide a manufacturing method of an optical waveguide, the optical waveguide including a first clad layer; a core layer formed on the first clad layer and configured to propagate light; a second clad layer formed on the first clad layer so as to cover the core layer; and a light propagation direction changing part configured to change a propagation direction of the light propagating in the core layer; the manufacturing method of the optical waveguide including the steps of: forming a concave part penetrating the first clad layer and the core layer; and inserting the light propagation direction changing part into the concave part so that a light propagation direction changing surface of the light propagation direction changing part forms a predetermined inclination angle to a predetermined reference plane.

One aspect of the present invention may be to provide an optical waveguide including a first clad layer; a core layer formed on the first clad layer and configured to propagate light; a second clad layer formed on the first clad layer so as to cover the core layer; and a light propagation direction changing part configured to change a propagation direction of the light propagating the core layer; wherein the light propagation direction changing part is formed to penetrate the core layer and a light propagation direction changing surface of the light propagation direction changing part is configured to form a predetermined inclination angle to a predetermined reference plane.

Another aspect of the present invention may be to provide an optical reception/transmission apparatus including the above-mentioned optical waveguide having two of the light propagation direction changing parts; a light emitting element; a light receiving element; and a substrate, wherein the optical waveguide is formed on the substrate, the light emitting element is formed above the optical waveguide and arranged to emit light to one of the light propagation direction changing parts, and the light receiving element is formed above the optical waveguide so as to receive the light, the light having a propagation direction being changed by another one of the light propagation direction changing parts.

Other objects, features, and advantages of the present invention will become more apparent from the following detailed description when read in conjunction with the accompanying drawings.

DETAILED DESCRIPTION OF THE PREFERRED EMBODIMENTS

A description is given below for embodiments of the present invention referring by the drawings.

First Embodiment

Figure 1:
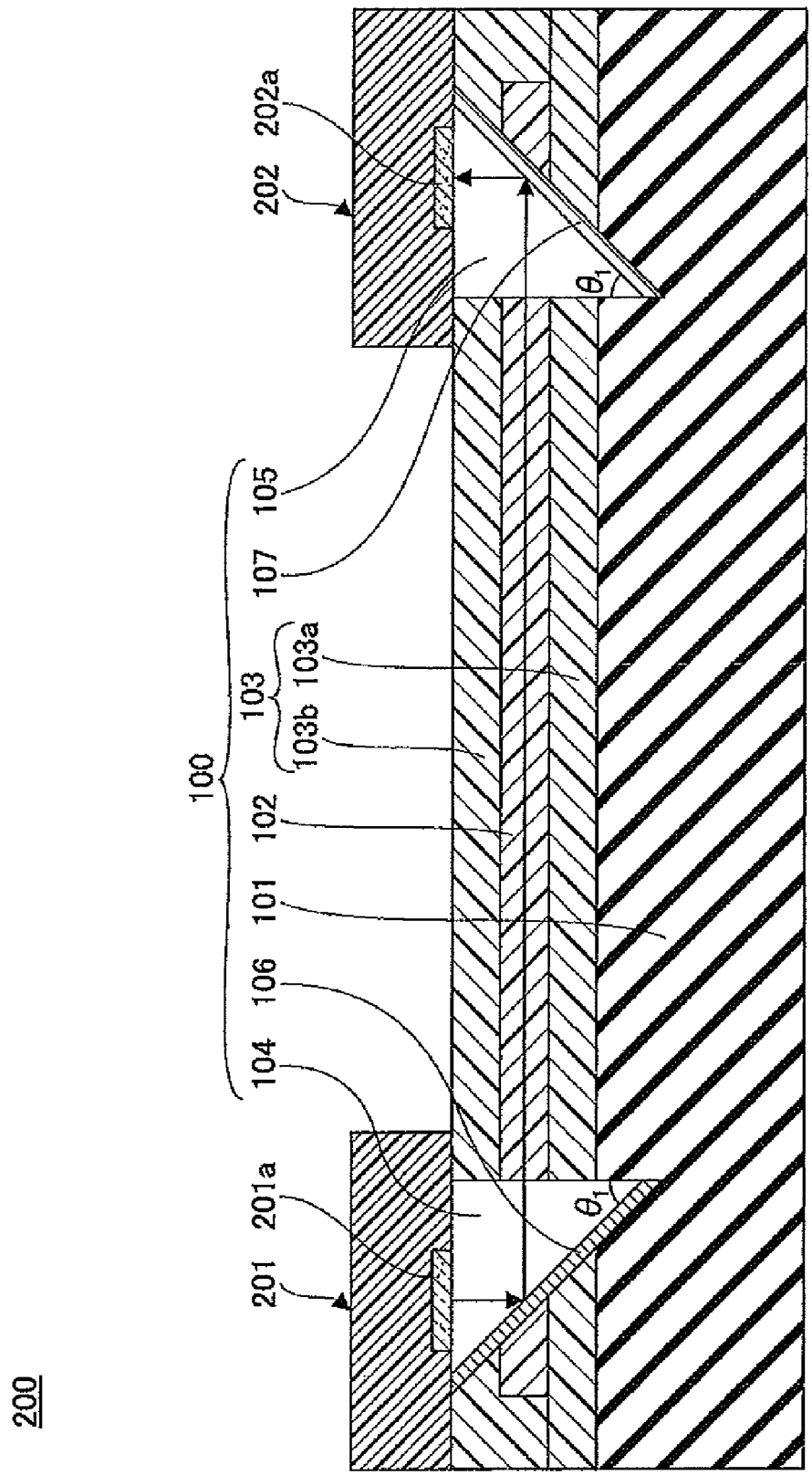
FIG. 1 shows an example of a cross section of an optical reception/transmission apparatus including an optical waveguide of a related art.
Figure 2:
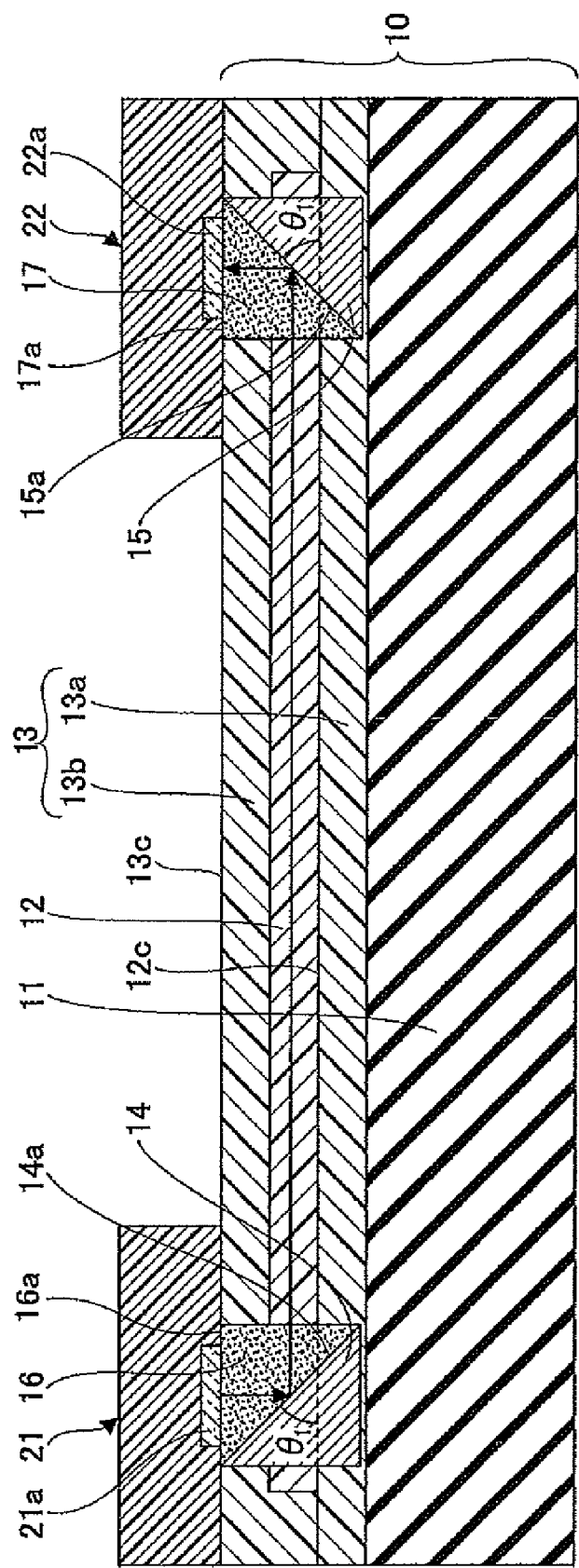
FIG. 2 shows an example of a cross section of an optical reception/transmission apparatus including an optical waveguide according to the first embodiment of this invention.
Figure 3:
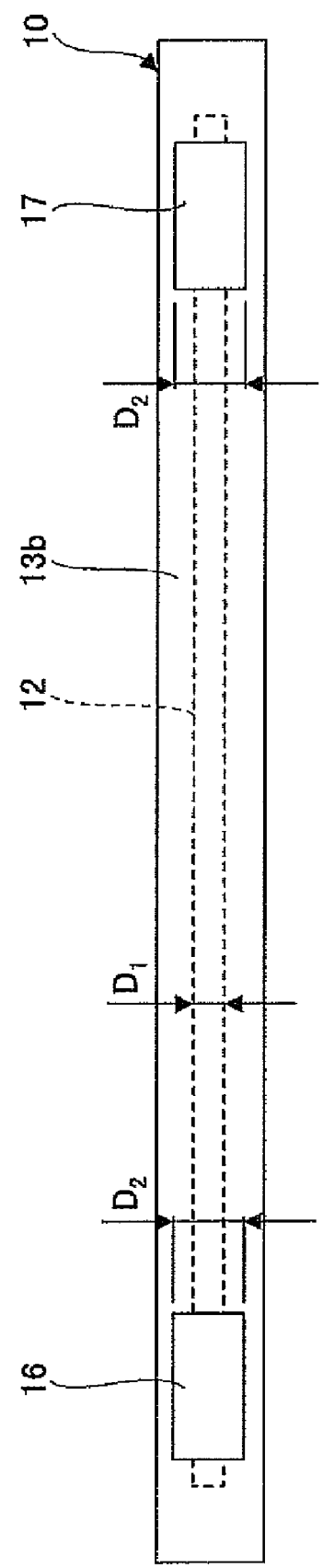
FIG. 3 shows an example of a plane view of the optical waveguide according to the first embodiment of this invention.

FIG. 2 shows an example of a cross section of an optical reception/transmission apparatus 20 including an optical waveguide 10 according to the first embodiment of this invention. FIG. 3 shows an example of a plane view of the optical waveguide 10 according to the first embodiment of this invention. Referring to FIG. 2 and FIG. 3, the optical reception/transmission apparatus 20 includes the optical waveguide 10, a light emitting element 21 having a light emitting part 21a and a light receiving element 22 having a light receiving part 22a.

The optical waveguide 10 includes a supporting substrate 11, a core layer 12, a clad layer 13, light propagation direction changing parts 14 and 15, and sealing parts 16 and 17. The clad layer 13 is formed by a first clad layer 13a and a second clad layer 13b.

A rear surface of the core 12 is indicated by 12c. A top surface of the second clad layer 13b is indicated by 13c, and surfaces of the light propagation direction changing parts 14 and 15 for changing a propagation direction of the light propagation are indicated by 14a and 15a. Top surfaces of the sealing parts 16 and 17 are indicated by 16a and 17a. A depth of the core layer 12 is indicated by $D_1$. A depth of the light propagation direction changing parts 14 and 15 is indicated by $D_2$.

The surfaces 14a and 15a of the light propagation direction changing parts 14 and 15 are arranged to have a predetermined angle to a predetermined reference plane so that a propagation direction of incident light can be changed. The predetermined reference plane may be, for example, parallel to the rear surface 12c of the core layer 12. The predetermined angle, an angle $\theta_1$ is formed between the rear surface 12c of the core layer 12 and the surfaces 14a and 15a of the light propagation direction changing parts 14 and 15. $\theta_1$ may be, for example, 45 degrees.

In the optical waveguide 10, the core layer 12 and the clad layer 13 are formed on the supporting substrate 11. The core layer 12 and the clad layer 13 are formed, for example, by a liquid state material such as polyimide resin, acryl resin, epoxy resin, polyolefin resin, polynorbornene resin, or polymer material formed by fluorinating these resins, or polymer material such as an epoxy-based material having a film shape.

The light propagation direction changing parts 14 and 15 are formed to penetrate the core layer 12 and a second clad layer 13b. The light propagation direction changing parts 14 and 15 are formed by blocks of metal (metal piece) such as stainless steel (SUS), aluminum (Al), or brass formed by copper (Cu) and zinc (Zn). The surfaces 14a and 15a of the light propagation direction changing parts 14 and 15 are finished (or processed) by a physical or chemical lapping process so as to have a smooth surface functioning for reflecting light.

A metal layer such as Al or Au may further be formed on the surfaces 14a and 15a of the light propagation direction changing parts 14 and 15 by the sputtering method or the electrolytic plating method. Any size of the depth $D_2$ of the light propagation direction changing parts 14 and 15 may be chosen as long as the depth $D_2$ is greater than the depth $D_1$ of the core layer 12.

A preliminary process of forming a metal layer on the surfaces 14a and 15a of the light propagation direction changing parts 14 and 15 is different from a related art process of forming the metal layers 106 and 107 on the 45 degree inclined parts of the optical waveguide 100. There is no need to perform a mask alignment process. Further, plural metal blocks (or pieces) forming the light propagation direction changing parts 14 and 15 can be formed in the same process. Thus the processing time is reduced, and no problem occurs unlike the related art. Further, there is no problem if the metal layer is formed on parts which are not on the surfaces 14a and 15a of the light propagation direction changing parts 14 and 15.

In the example of FIG. 2, the angle $\theta_1$ formed between the rear surface 12c of the core layer 12 and the surfaces 14a and 15a of the light propagation direction changing parts 14 and 15 is set as approximately 45 degrees, however, $\theta_1$ is not limited to 45 degrees. The angle $\theta_1$ may be chosen to be any angle which provides satisfactory optical coupling between the optical waveguide 10 and the light emitting element 21 and between the optical waveguide 10 and the light receiving element 22. The angle $\theta_1$ of the left side may be chosen to be different from the angle $\theta_1$ of the right side.

The light propagation direction changing parts 14 and 15 are sealed by the sealing parts 16 and 17. The top surfaces 16a and 17a of the sealing parts 16 and 17 and the top surfaces 13b and 13c of the clad layer 13 are formed to be approximately in the same plane. The sealing parts 16 and 17 are formed from adhesive material having approximately the same refractive index as that of the core layer 12. The sealing parts 16 and 17 increase the mechanical strength of parts where the light propagation direction changing parts 14 and 15 are formed. The sealing parts 16 and 17 are formed to improve the optical coupling property between the core layer 12 and the light emitting element 21 and between the core layer 12 and the light receiving element 22.

The light emitting part 21a of the light emitting element 21 and the light receiving part 22a of the light receiving element 22 are disposed on the top surface 13c of the second clad layer 13b and the surfaces 14a and 15a of the light propagation direction changing parts 14 and 15. The light emitting element 21 is configured to emit light to the surface 14a of the light propagation direction changing part 14. The light receiving element 22 is configured to receive the light whose propagation direction is changed by the surface 15a of the light propagation direction changing part 15. As the light emitting element 21, for example, a semiconductor laser or the like may be used. As the light receiving element 22, for example, a photodiode may be used.

In the optical reception/transmission apparatus 20, light emitted from the light emitting part 21a of the light emitting element 21 enters the sealing part 16 of the optical waveguide 10. As shown in FIG. 2 with the arrow, the propagation direction of the light is changed by 90 degrees with the surface 14a of the light propagation direction changing part 14 and the light enters the core layer 12. A refractive index of the core layer 12 is chosen to be greater than that of the clad layer 13. The light entering to the core layer 12 propagates within the core layer 12 without transmitting through the clad layer 13.

The light propagating within the core layer 12 reaches the light propagation direction changing part 15 via the sealing part 17. The propagation direction of the light is changed by 90 degrees with the surface 15a of the light propagation direction changing part 15 and enters the light receiving part 22a of the light receiving element 22. In this way, the light propagation direction changing part 14 and the light propagation direction changing part 15 function as direction changing parts of light propagation direction.

Next, a description will be given for a manufacturing method of the optical waveguide 10 according to the first embodiment of this invention. FIGS. 4 through 10 are drawings showing the manufacturing method of the optical waveguide 10 according to the first embodiment of this invention. In FIG. 4 through FIG. 10, identical parts used in FIG. 2 and FIG. 3 are indicated by the same symbols and the description will be omitted.

Figure 4:
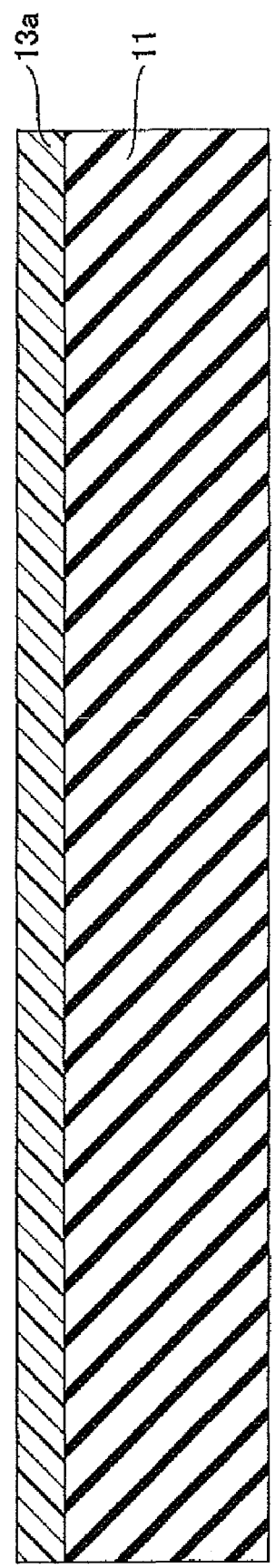
FIG. 4 shows an example of a manufacturing process of the optical waveguide according to the first embodiment of this invention (case 1)

In a process shown in FIG. 4, first, a supporting substrate 11 is provided and a first clad layer 13a is formed on the supporting substrate 11. As the supporting substrate 11, for example, a glass substrate, a silicon substrate or the like may be used. Further, it is possible to use a substrate as the supporting substrate 11 on which an electrical circuit is formed and the first clad layer 13a is directly formed.

It is possible to form the first clad layer 13a by coating, for example, a liquid state material such as polyimide resin, acryl resin, epoxy resin, polyolefin resin, polynorbornene resin, or polymer material formed by fluorinating these resins on the supporting substrate 11, and followed by a curing process of ultra violet radiation and thermal treatment. Also, it is possible to form the first clad layer 13a by laminating a polymer material such as an epoxy-based film having film shape on the supporting substrate 11 and curing the material with the ultra violet radiation and thermal treatment. The thickness of the first clad layer 53a may be, for example, approximately 10 μm through approximately 60 μm.

Figure 5:
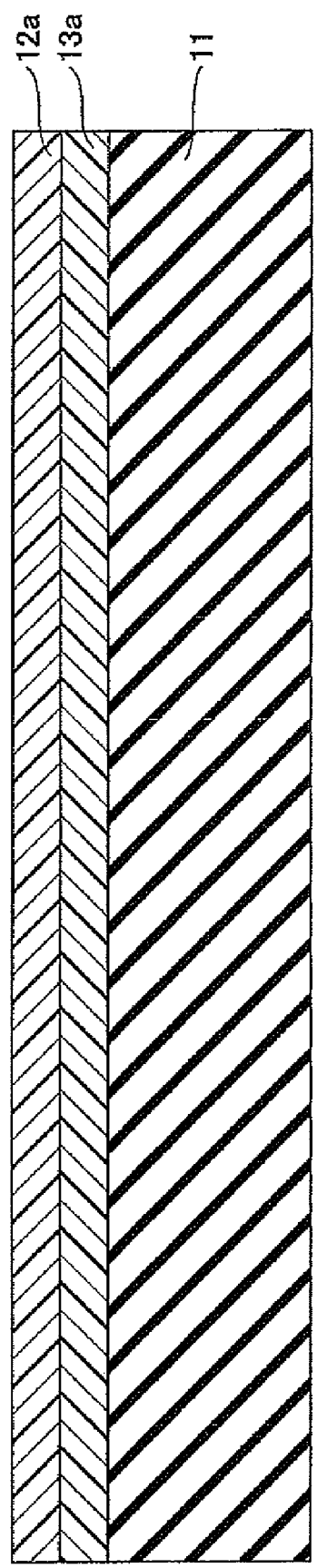
FIG. 5 shows an example of the manufacturing process of the optical waveguide according to the first embodiment of this invention (case 2)

In a process shown in FIG. 5, a core layer 12a is formed on the first clad layer 13a. The core layer 12a is patterned to form a core layer 12. It is possible to form the core layer 12a by coating, for example, a liquid state material such as polyimide resin, acryl resin, epoxy resin, polyolefin resin, polynorbornene resin, or polymer material formed by fluorinating these resins on the first clad layer 13a. Also, it is possible to form the core layer 12a by laminating the first clad layer 13a with polymer material such as an epoxy-based material having a film shape.

In this case, a refractive index of the core layer 12a needs to be chosen to be greater than that of the clad layer 13. The polymer material of the core layer 12a described above includes, for example, additives for controlling the refractive index such as germanium (Ge). The thickness of the core layer 12a may be, for example, approximately 30 μm through approximately 80 μm.

Figure 6:
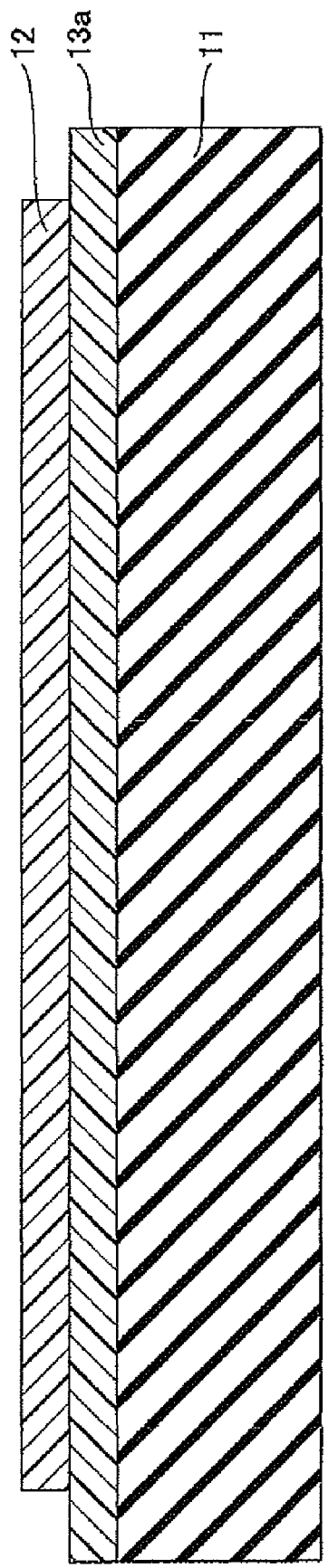
FIG. 6 shows an example of the manufacturing process of the optical waveguide according to the first embodiment of this invention (case 3)

Next, in a process shown in FIG. 6, the core layer 12a is patterned to form the core layer 12. For example, when a negative type photo sensitive material is used for forming the core layer 12a, a photo mask (not shown) is used to cover so that only an area of the core layer 12 of the negative type photo sensitive material is exposed. An exposure process and development process are performed and curing is performed by ultra violet light radiation and thermal treatment.

Figure 7:
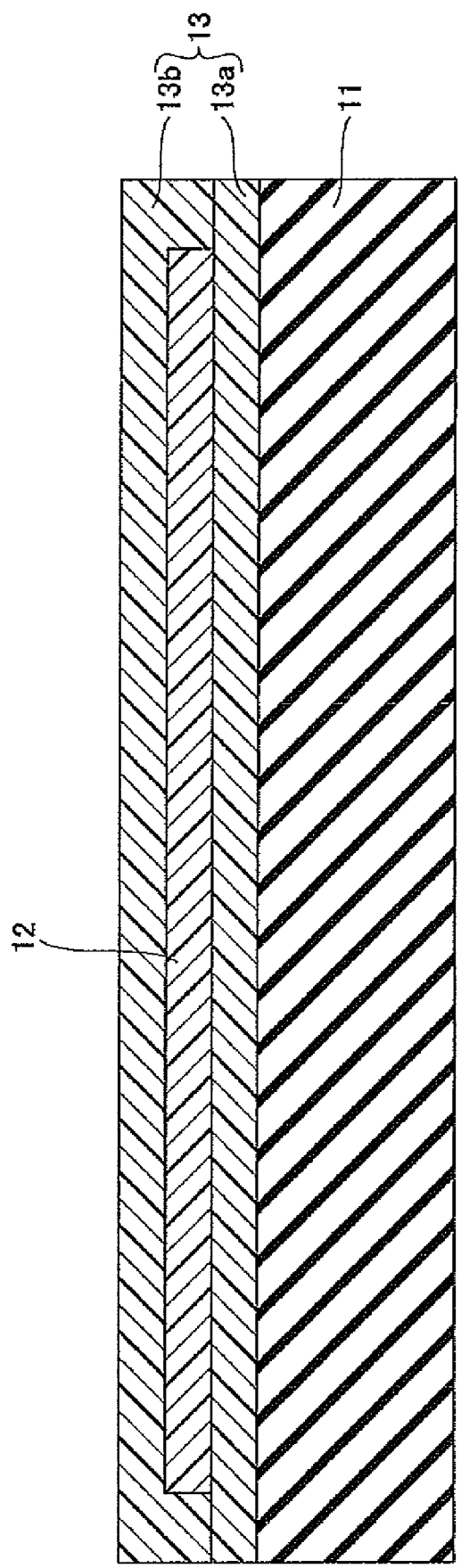
FIG. 7 shows an example of the manufacturing process of the optical waveguide according to the first embodiment of this invention (case 4)

In a process shown in FIG. 7, a second clad layer 13b is formed on the first clad layer 13a to cover the core layer 12. The second clad layer 13b is formed by coating or laminating the same material used for forming the first clad layer 13a on the core layer 12 and the first clad layer 13a and curing by ultra violet light radiation and thermal treatment. The total thickness of the core layer 12 and the clad layer 13 may be, for example, approximately 50 μm through approximately 200 μm.

Figure 8:
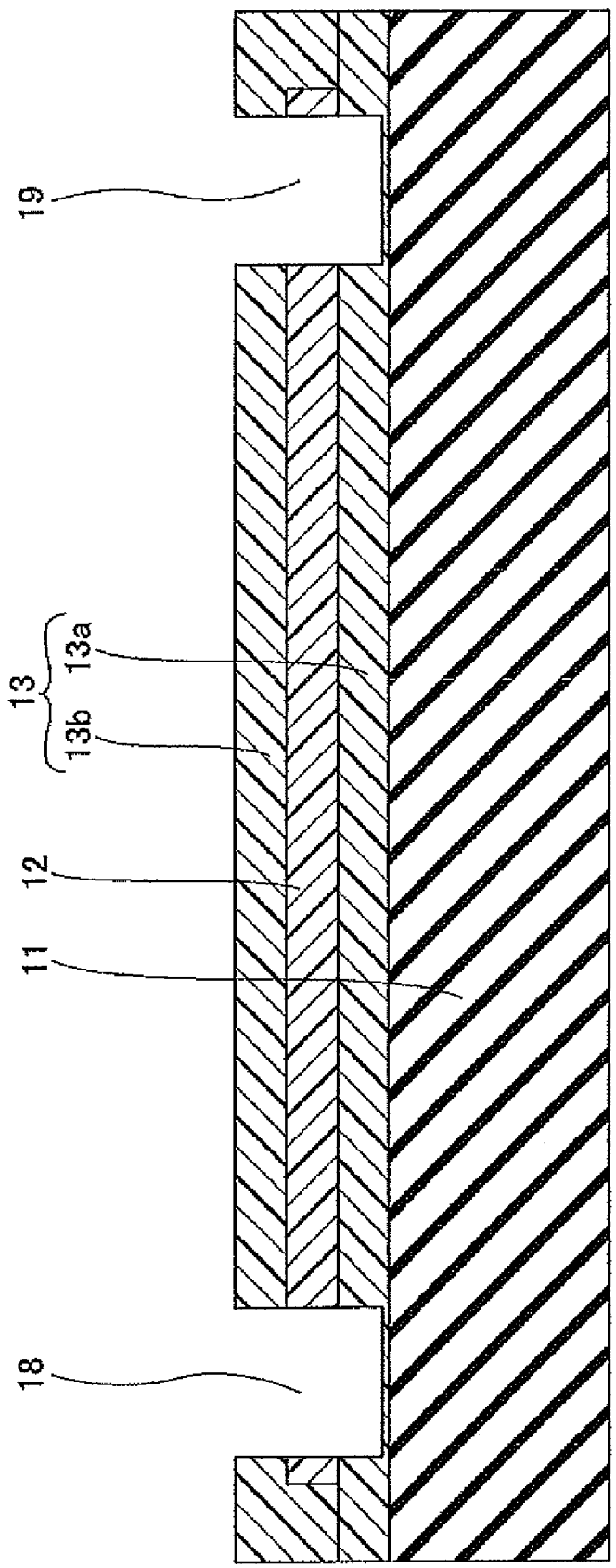
FIG. 8 shows an example of the manufacturing process of the optical waveguide according to the first embodiment of this invention (case 5)

In a process shown in FIG. 8, for example, concave parts, rectangular shaped grooves 18 and 19 are formed on the structure of FIG. 7 to penetrate the core layer 12 and first clad layer 13a by use of a method such as a laser process or dicing process. In a process shown in FIG. 9, the light propagation direction changing parts 14 and 15 are inserted into the concave parts 18 and 19 so that the light propagation direction changing surface 14a and the light propagation direction changing surface 15a face each other. With respect to sizes of the concave parts 18 and 19 and the light propagation direction changing parts 14 and 15, the sizes of the concave parts 18 and 19 are chosen to be greater than the light propagation direction changing parts 14 and 15 so that it is not necessary to press the light propagation direction changing parts 14 and 15 in to the concave parts 18 and 19.

The surfaces 14a and 15a of the light propagation direction changing parts 14 and 15 are formed by, for example, a physical or chemical lapping process so as to smooth planes, which can reflect light. As the light propagation direction changing parts 14 and 15, any metal may be chosen as long as the metal reflects light well. After a metal layer such as Al or Au is further formed on the surfaces 14a and 15a of the light propagation direction changing parts 14 and 15 by a sputtering method or a metal plating method, the light propagation direction changing parts 14 and 15 may be inserted. If the metal initially has a satisfactory light reflection property, there is no need to perform a specific processing for the metal.

Figure 10:
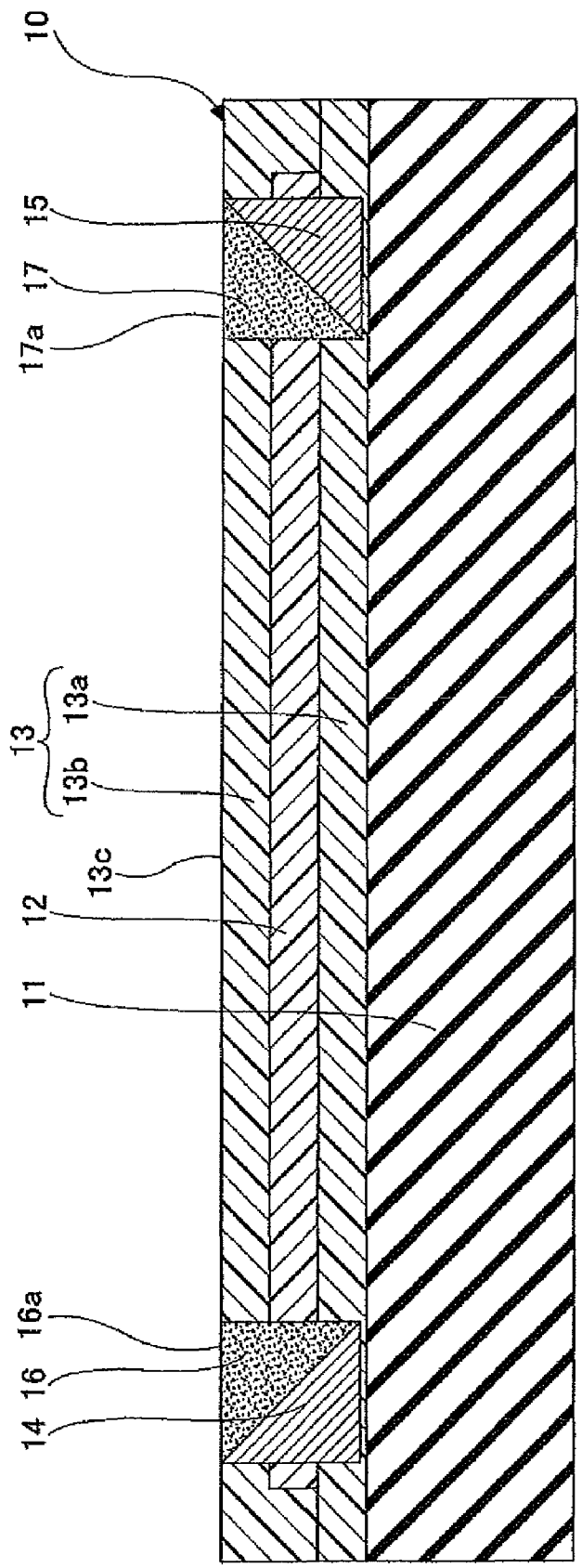
FIG. 10 shows an example of the manufacturing process of the optical waveguide according to the first embodiment of this invention (case 7)

In a process of FIG. 10, sealing material is coated on the surfaces 14a and 15a of the light propagation direction changing parts 14 and 15 inserted into the concave parts 18 and 19 to form the sealing parts 16 and 17 so that top surfaces of the sealing parts 16 and 17 and the top surface 13c of the second clad layer 13b are approximately in the same plane.

As the sealing parts 16 and 17, for example, optical coupling adhesive or the like to be cured by ultra violet light radiation can be used. Since it is possible to precisely control the refractive index of the optical coupling adhesive within ±0.005, the optical coupling adhesive, which is controlled to have approximately the same refractive index as that of the core layer 12, is used.

When the optical coupling adhesive of an ultra violet curing type is used as the sealing parts 16 and 17, the optical coupling adhesive is cured by ultra violet light radiation after the optical coupling adhesive is coated onto the surfaces 14a and 15a of the light propagation direction changing parts 14 and 15. With this process, the sealing parts 16 and 17 are formed. By using the optical coupling adhesive as the sealing parts 16 and 17, the mechanical strength of parts of which the light propagation direction changing parts 14 and 15 are formed is increased, and the optical coupling property between the core layer 12 and the light emitting element 21 and between the core layer 12 and the light receiving element 22 is improved. In this way, the optical waveguide 10 of the first embodiment of this invention is manufactured.

According to the optical waveguide 10 of the first embodiment of this invention, the concave parts 18 and 19, which are easily processed, are formed to penetrate the core layer 12 and the second clad layer 13b after the core layer 12 and the clad layer 13 are formed on the supporting substrate 11. The light propagation direction changing parts are formed by inserting the light propagation direction changing parts 14 and 15 into the concave parts 18 and 19. The light propagation direction changing parts 14 and 15 can be formed independent of whether the core layer 12 and the clad layer 13 are liquid state material or film shaped material.

Further, since there is no need of a process such as forming complicated shaped grooves and forming the metal layer on the inclined part after providing the core layer 12 and the clad layer 13, the light propagation direction changing parts 14 and 15 can be formed by simple processes.

According to the optical waveguide 10 of the first embodiment of this invention, the concave parts 18 and 19 are formed to penetrate the core layer 12 and the second clad layer 13b, and the light propagation direction changing parts are formed by inserting the light propagation direction changing parts 14 and 15 into the concave parts 18 and 19. With this, directions of the surfaces 14a and 15a of the light propagation direction changing parts 14 and 15 can be easily faced to the light emitting part 21a of the light emitting element 21 and the light receiving part 22a of the light receiving element 22. The optical reception/transmission apparatus 20 can be manufactured by forming the optical waveguide 10 on a substrate on which an electric circuit is formed.

Second Embodiment

Figure 11:
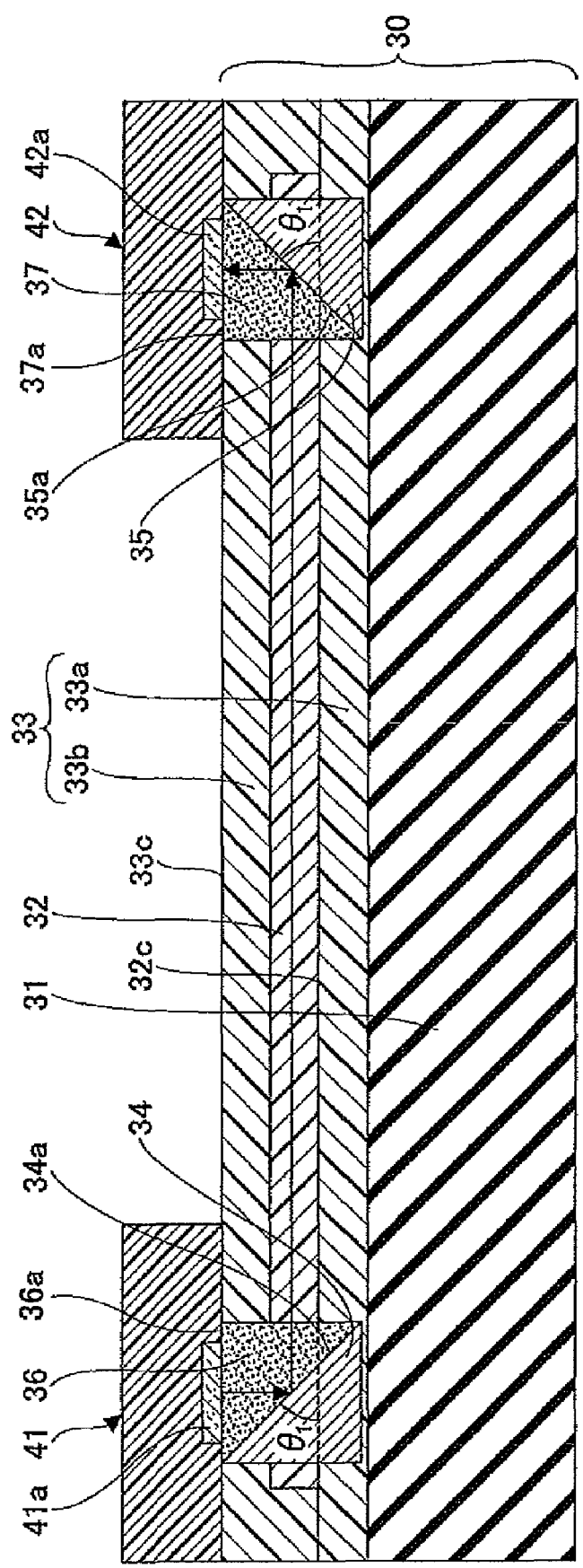
FIG. 11 shows an example of a cross section of an optical reception/transmission apparatus including an optical waveguide according to the second embodiment of this invention.
Figure 12:
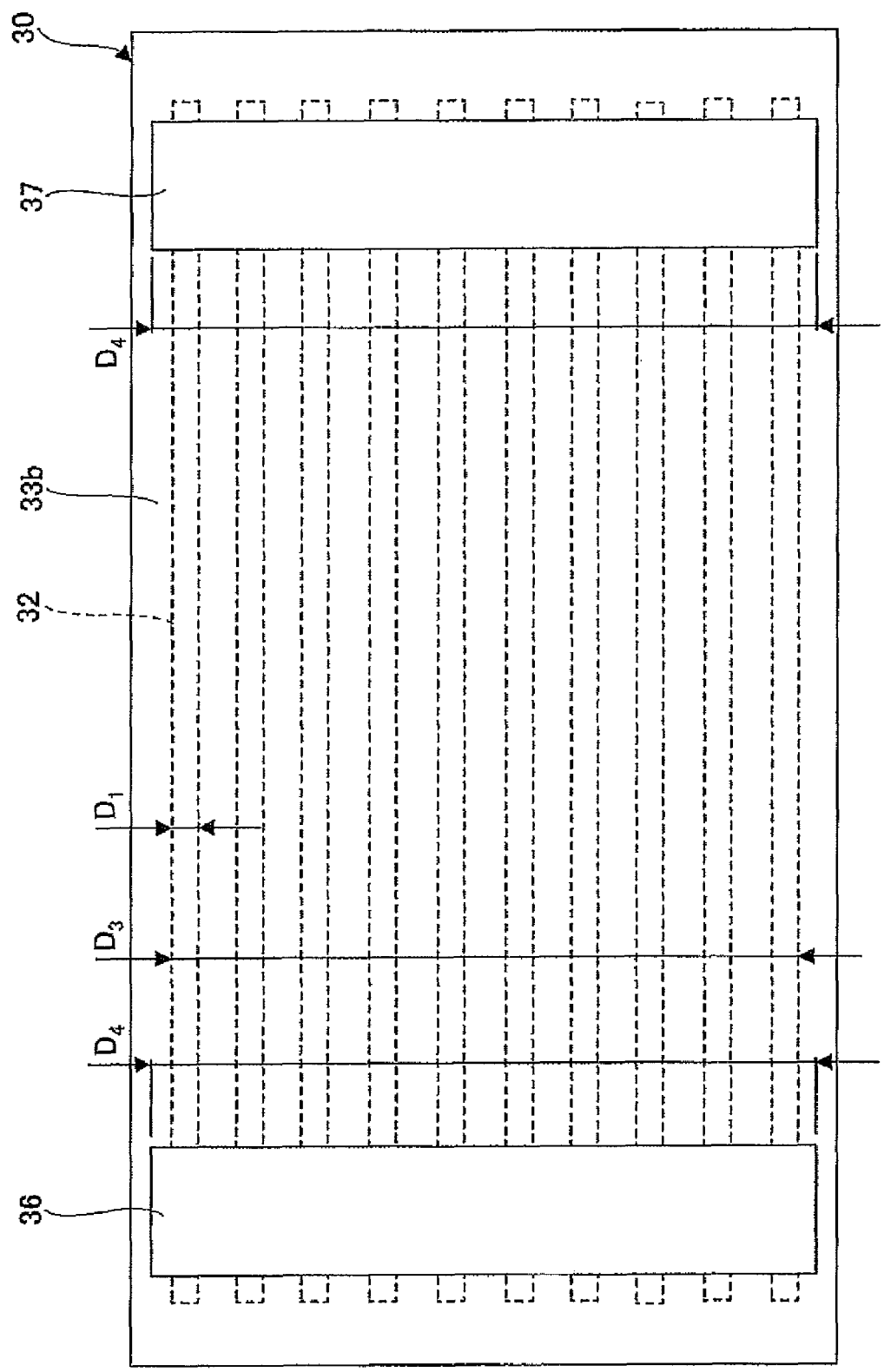
FIG. 12 shows an example of a cross section of an optical reception/transmission apparatus including an optical waveguide according to the second embodiment of this invention.

FIG. 11 is a cross section showing an optical reception/transmission apparatus 40 having an optical waveguide 30 according to the second embodiment of this invention. FIG. 12 is a plane view of the optical waveguide 30 according to the second embodiment of this invention. Referring to FIG. 11 and FIG. 12, the optical reception/transmission apparatus 40 is provided with the optical waveguide 30, a light emitting element array 41 having plural light emitting parts 41a, and a light receiving element array 42 having plural light receiving parts 42a.

The optical waveguide 30 includes a supporting substrate 31, plural core layers 32, a clad layer 33, light propagation direction changing parts 34 and 35, and sealing parts 36 and 37. The clad layer 33 includes a first clad layer 33a and a second clad layer 33b.

A rear surface of the core 32 is indicated by 32c. A top surface of the second clad layer 33b is indicated by 33c, and surfaces of the light propagation direction changing parts 34 and 35 for changing a propagation direction of the light propagation are indicated by 34a and 35a. The top surfaces of the sealing parts 36 and 37 are indicated by 36a and 37a. A depth of the core layer 32 is indicated by $D_1$, and the total depth of plural core layers 32 is indicated by $D_4$.

The surfaces 34a and 35a of the light propagation direction changing parts 34 and 35 are arranged to have a predetermined angle to a predetermined reference plane so that a propagation direction of incident light can be changed. The predetermined reference plane may be, for example, parallel to the rear surface 32c of the core layer 32. The predetermined angle, an angle $\theta_1$ is formed between the rear surface 32c of the core layer 32 and the surfaces 34a and 35a of the light propagation direction changing parts 34 and 35. $\theta_1$ may be, for example, 45 degrees.

In the optical waveguide 30, the plural core layers 32 and the clad layer 33 are formed on the supporting substrate 31. The plural core layers 32 and the clad layer 33 are formed, for example, by a liquid state material such as polyimide resin, acryl resin, epoxy resin, polyolefin resin, polynorbornene resin, or polymer material formed by fluorinating these resins, or polymer material formed of an epoxy-based material having a film shape.

The light propagation direction changing parts 34 and 35 are formed to penetrate the plural core layers 32 and the second clad layer 33b. The light propagation direction changing parts 34 and 35 are formed by blocks of metal (metal piece) such as stainless steel (SUS), aluminum (Al), or brass formed by copper (Cu) and zinc (Zn). The surfaces 34a and 35a of the light propagation direction changing parts 34 and 35 are finished (or processed) by a physical or chemical lapping process so as to have a smooth surface functioning for reflecting light.

A metal layer such as Al or Au may be further formed on the surfaces 34a and 35a of the light propagation direction changing parts 34 and 35 by the sputtering method or the electrolytic plating method. Any size of the depth $D_4$ of the light propagation direction changing parts 34 and 35 may be chosen as long as the depth $D_4$ is greater than the total depth $D_3$ of the plural core layers 32.

In the example of FIG. 11, the angle $\theta_1$ formed between the rear surface 32c of the core layer 32 and the surfaces 34a and 35a of the light propagation direction changing parts 34 and 35 is set as approximately 45 degrees, however, $\theta_1$ is not limited to 45 degrees. The angle $\theta_1$ may be chosen to be any angle which provides satisfactory optical coupling between the optical waveguide 30 and the light emitting element array 41 and between the optical waveguide 30 and the light receiving element array 42. The angle $\theta_1$ of the left side may be chosen to be different from the angle $\theta_1$ of the right side.

The light propagation direction changing parts 34 and 35 are sealed by the sealing parts 36 and 37. The top surfaces 36a and 37a of the sealing parts 36 and 37 and the top surfaces 33b and 33c of the clad layer 33 are formed to be approximately in the same plane. The sealing parts 36 and 37 are formed from adhesive material having approximately the same refractive index as that of the plural core layers 32. The sealing parts 36 and 37 increase the mechanical strength of parts where the light propagation direction changing parts 34 and 35 are formed. The sealing parts 36 and 37 are formed to improve the optical coupling property between the plural core layers 32 and the light emitting element array 41 and between the plural core layers 32 and the light receiving element array 42.

The plural light emitting parts 41a of the light emitting element array 41 and the plural light receiving parts 42a of the light receiving element array 42 are disposed on the top surface 33c of the second clad layer 33b and the surfaces 34a and 35a of the light propagation direction changing parts 34 and 35. The light emitting element array 41 is disposed to emit light to the surface 34a of the light propagation direction changing part 34. The light receiving element array 42 is configured to receive the light whose propagation direction is changed by the surface 35a of the light propagation direction changing part 35. As the light emitting element array 41, for example, a semiconductor laser array or the like may be used. As the light receiving element array 42, for example, a photodiode array may be used.

In the optical reception/transmission apparatus 40, light simultaneously or differently emitted from the plural light emitting parts 41a of the light emitting element array 41 enter the sealing part 36 of the optical waveguide 30. As shown in FIG. 11 with the arrow, the propagation direction of the light is changed by 90 degrees with the surface 34a of the light propagation direction changing part 34 and the light enters the corresponding core layer 32. A refractive index of the core layer 32 is chosen to be greater than that of the clad layer 33. The light entering into the core layer 32 propagates within the core layer 32 without transmitting through the clad layer 33.

The light propagating within the core layer 32 reaches the light propagation direction changing part 35 via the sealing part 37. The propagation direction of the light is changed by 90 degrees with the surface 35a of the light propagation direction changing part 35 and enters the corresponding plural light receiving parts 42a of the light receiving element array 42. In this way, the light propagation direction changing part 34 and the light propagation direction changing part 35 function as light propagation direction changing parts.

In this way, the optical reception/transmission apparatus 40 including the optical waveguide 30 can be achieved in which the optical waveguide 30 is compatible with plural channels which are provided with the plural core layers 32, the plural light emitting parts 41a of the light emitting element array 41 and the plural light receiving element parts 42a of the receiving element array 42. In FIG. 11 and FIG. 12, an example is shown for the optical reception/transmission apparatus 40 having the optical waveguide 30 which can adapt to ten channels including ten of the core layers 32, ten of the light emitting element parts 41a of the light emitting element array 41, and ten of the light receiving element parts 42a of the light receiving element array 42. However, the number of channels may be different from ten.

Next, a description will be given for a manufacturing method of the optical waveguide 30 according to the second embodiment of this invention. The manufacturing method of the optical waveguide 30 according to the second embodiment of this invention is similar to that of the optical waveguide 10 according to the first embodiment of this invention. Thus, the description will be mainly given for processes of the manufacturing method of the second embodiment different from that of the optical waveguide 10 of the first embodiment by referring to figures used for explaining the optical waveguide 10 of the first embodiment of this invention.

First, after the processes corresponding to those of FIG. 4 and FIG. 5 of the first embodiment are performed, the plural core layers 32 are formed by patterning the plural core layers 32a formed on the top surface of the first clad layer 33a in the process of FIG. 6. Next, after performing the process corresponding to that of FIG. 7, two concave parts, rectangular shaped grooves are formed on the structure of FIG. 7 so as to penetrate the plural core layers 32 and the second clad layer 33b by use of a method such as a laser process or dicing process.

Figure 9:
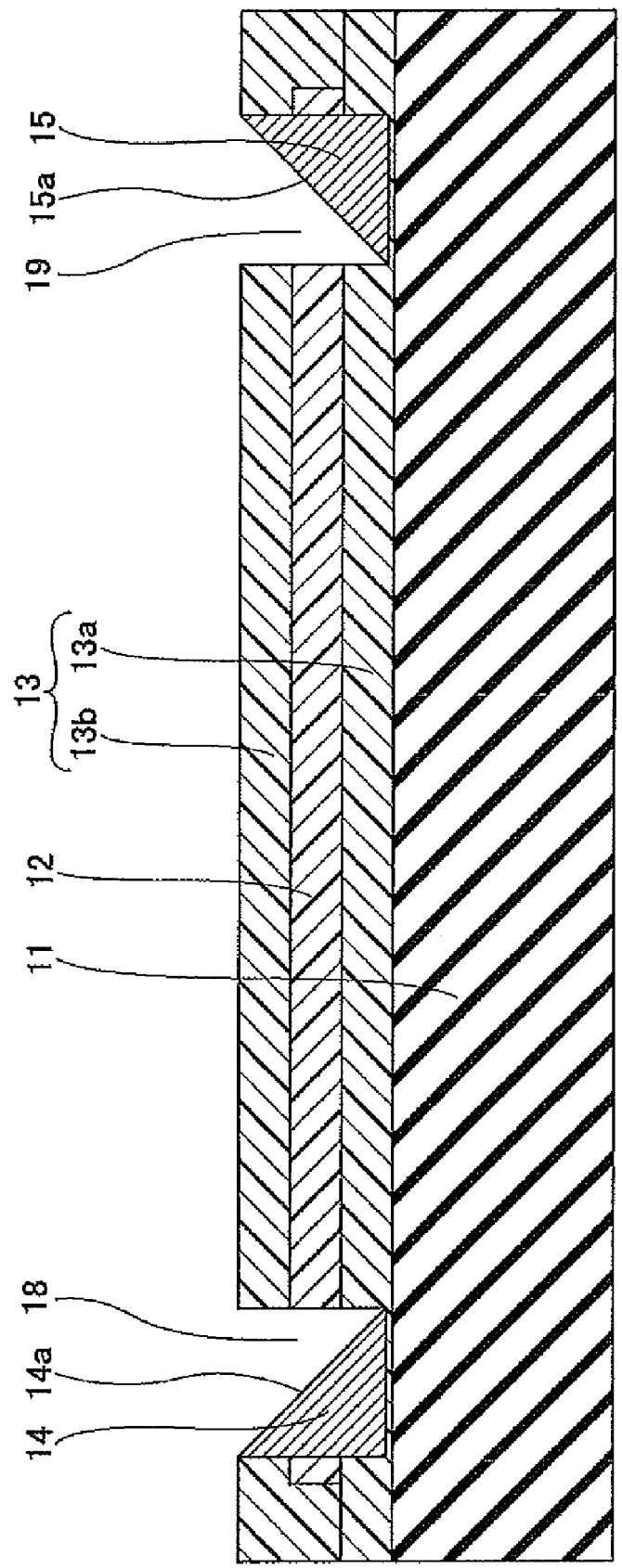
FIG. 9 shows an example of the manufacturing process of the optical waveguide according to the first embodiment of this invention (case 6)

After the process of FIG. 9 is performed, the light propagation direction changing parts 34 and 35 are inserted into the two concave parts so that the light propagation direction changing surfaces 34a and 35a face one another. With respect to sizes of the concave parts and the light propagation direction changing parts 34 and 35, the sizes of the concave parts are chosen to be greater than the light propagation direction changing parts 34 and 35 so that it is not necessary to press the light propagation direction changing parts 34 and 35 into the concave parts.

Next, in the process of FIG. 10, the sealing material is coated on the surfaces 34a and 35a of the light propagation direction changing parts 34 and 35 inserted into the concave parts to form the sealing parts 36 and 37 so that top surfaces of the sealing parts 36 and 37 and the top surface 33c of the second clad layer 33h are approximately in the same plane. In this way, the optical waveguide 30 compatible with the plural channels including the plural core layers 32 of the second embodiment of this invention is manufactured.

According to the second embodiment of this invention, similar to the optical waveguide 10 of the first embodiment, after the plural core layers 32 and the clad layer 33 are formed on the supporting substrate 31, the two concave parts, which are easily processed, are formed to penetrate the plural core layers 32 and the second clad layer 33b. The light propagation direction changing parts are formed by inserting the light propagation direction changing parts 34 and 35 into the two concave parts. The light propagation direction changing parts 34 and 35 can be formed independent of whether the plural core layers 32 and the clad layer 33 are liquid state material or film shaped material.

Further, since there is no need of a process such as forming complicated shaped grooves and forming the metal layer on the inclined part after providing the plural core layers 32 and the clad layer 33, the light propagation direction changing parts 34 and 35 can be formed by simple processes.

According to the optical waveguide 30 of the second embodiment of this invention, similar to the optical waveguide 10, the two concave parts are formed to penetrate the plural core layers 32 and the second clad layer 33b, and the light propagation direction changing parts are formed by inserting the light propagation direction changing parts 34 and 35 into the two concave parts. With this, directions of the surfaces 34a and 35a of the light propagation direction changing parts 34 and 35 can be easily faced to the plural light emitting parts 41a of the light emitting element array 41 and the plural light receiving parts 42a of the light receiving element array 42. The optical reception/transmission apparatus 40 can be manufactured by forming the optical waveguide 30 on a substrate on which an electric circuit is formed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

For example, in the first embodiment and the second embodiment of this invention, the waveguide including two of the light propagation direction changing parts are shown as an example. This invention can be further applied to an optical waveguide having a single light propagation direction changing part for changing the propagation direction of light emitted from a light emitting element, or an optical waveguide having a single light propagation direction changing part for changing the propagation direction of incident light to the light receiving element.

According to the embodiments of the present invention, there are provided the manufacturing method of the optical waveguide in which the optical waveguide is formed independent of materials, whereby the light propagation direction changing part can be formed by a simple process, the optical waveguide, and the optical reception/transmission apparatus.

This patent application is based on Japanese Priority Patent Application No. 2008-095297 filed on Apr. 1, 2008, the entire contents of which are hereby incorporated by reference.

What is claimed is:

1. An optical waveguide comprising:
   a first clad layer;
   a core layer formed on the first clad layer to extend in a reference plane and configured to propagate light;
   a second clad layer formed on the first clad layer and covering the core layer, said second clad lay having a first top surface located opposite the first clad layer; and
   a light propagation direction changing part made of a metal block or a metal alloy block having a light propagation direction changing surface and configured to change a propagation direction of the light propagating the core layer; and
   a sealing part configured to seal the light propagation direction changing, and having a second top surface that is located on a plane approximately matching the first top surface,
   wherein the light propagation direction changing part is formed within a groove that penetrates the second clad layer and the core layer and extends in a predetermined direction approximately perpendicular to the reference plane,
   the light propagation direction changing part makes direct contact with a first surface defining a bottom of the groove and a second surface defining a first side of the groove extending in the predetermined direction, and
   the light propagation direction changing surface of the light propagation direction changing part forms a predetermined inclination angle to the reference plane.

2. The optical waveguide as claimed in claim 1, wherein the sealing part is formed within the groove and makes contact with the light propagation direction changing surface of the light propagation direction changing part and a third surface defining a second side of the groove extending in the predetermined direction.

3. The optical waveguide as claimed in claim 1, wherein the sealing part is made of a sealing material having a refractive index that is approximately the same as a refractive index of the core layer.

4. The optical waveguide as claimed in claim 1, wherein:
   the core layer includes a plurality of the core layers formed on the first clad layer, and
   the second clad layer covers the plurality of the core layers.

5. The optical waveguide as claimed in claim 1, wherein the second surface defining the first side of the groove is formed by exposed end surfaces of the second clad layer and the core layer.

6. The optical waveguide as claimed in claim 2, wherein:
   the second surface defining the first side of the groove is formed by first exposed end surfaces of the second clad layer and the core layer,
   the third surface defining the second side of the groove is formed by second exposed end surfaces of the second clad layer and the core layer, and
   the second surface and the third surface confront each other and are parallel to each other.

7. An optical reception/transmission apparatus comprising:

an optical waveguide comprising: a first clad layer;
a core layer formed on the first clad layer to extend in a reference plane and configured to propagate tight;
a second clad layer formed on file first clad layer and coverings the core layer, said second dad layer, having a first top surface located opposite the first clad layer;
first and second light propagation direction changing parts respectively made of a metal block or a metal alloy block having a light propagation direction changing surface and configured to change a propagation direction of the light propagating the core layer; and
first and second sealing parts configured to seal the first and second light propagation direction changing parts, respectively, each of the first and second sealing parts having a second top surface that is located on a plane approximately matching the first top surface,
wherein the first and second light propagation direction changing parts are formed within corresponding first and second grooves that penetrate the second clad layer and the core layer and extend in a predetermined direction approximately perpendicular to the reference plane, the first and second light propagation direction changing parts make direct contact with a first surface defining a bottom of the corresponding first and second grooves and a second surface defining a first side of the corresponding first and second grooves extending in the predetermined direction, and the light propagation direction changing surface of each of the first and second light propagation direction changing parts forms a predetermined inclination angle to the reference plane;
a light emitting element disposed on the second top surface of the first sealing part, and configured to emit light onto the light propagation direction changing surface of the first light propagation direction changing part through the first sealing part; and
a light receiving element disposed on the second top surface of the second sealing part and configured to receive light propagated through the core layer and reflected by the light propagation direction changing surface of the second light propagation direction changing part through the second sealing part.

8. The optical reception/transmission apparatus as claimed in claim 7, wherein the second surface defining the first side of each of the first and second grooves is formed by exposed end surfaces of the second clad layer and the core layer.

9. The optical reception/transmission apparatus as claimed in claim 7, wherein the first and second sealing parts are formed within the corresponding first and second grooves, and make contact with the light propagation direction changing surface of the corresponding first and second light propagation direction changing parts and a third surface defining a second side of the corresponding first and second grooves extending in the predetermined direction.

10. The optical reception/transmission apparatus as claimed in claim 9, wherein:
the second surface defining the first side of each of the first and second grooves is formed by first exposed end surfaces of the second clad layer and the core layer,
the third surface defining the second side of each of the first and second grooves is formed by second exposed end surfaces of the second clad layer and the core layer, and
the second surface and the third surface confront each other and are parallel to each other at each of the first and second grooves.

11. The optical reception/transmission apparatus as claimed in claim 7, wherein each of the first and second sealing parts is made of a sealing material having a refractive index that is approximately the same as a refractive index of the core layer.

12. The optical reception/transmission apparatus as claimed in claim 7, wherein:
the core layer includes a plurality of the core layers formed on the first clad layer, and the second clad layer covers the plurality of the core layers.

* * * * *